Jan. 23, 1940.  G. H. BURTON  2,188,032
LINE SUPPORTING DEVICE AND INSTALLATION
Filed Nov. 14, 1938
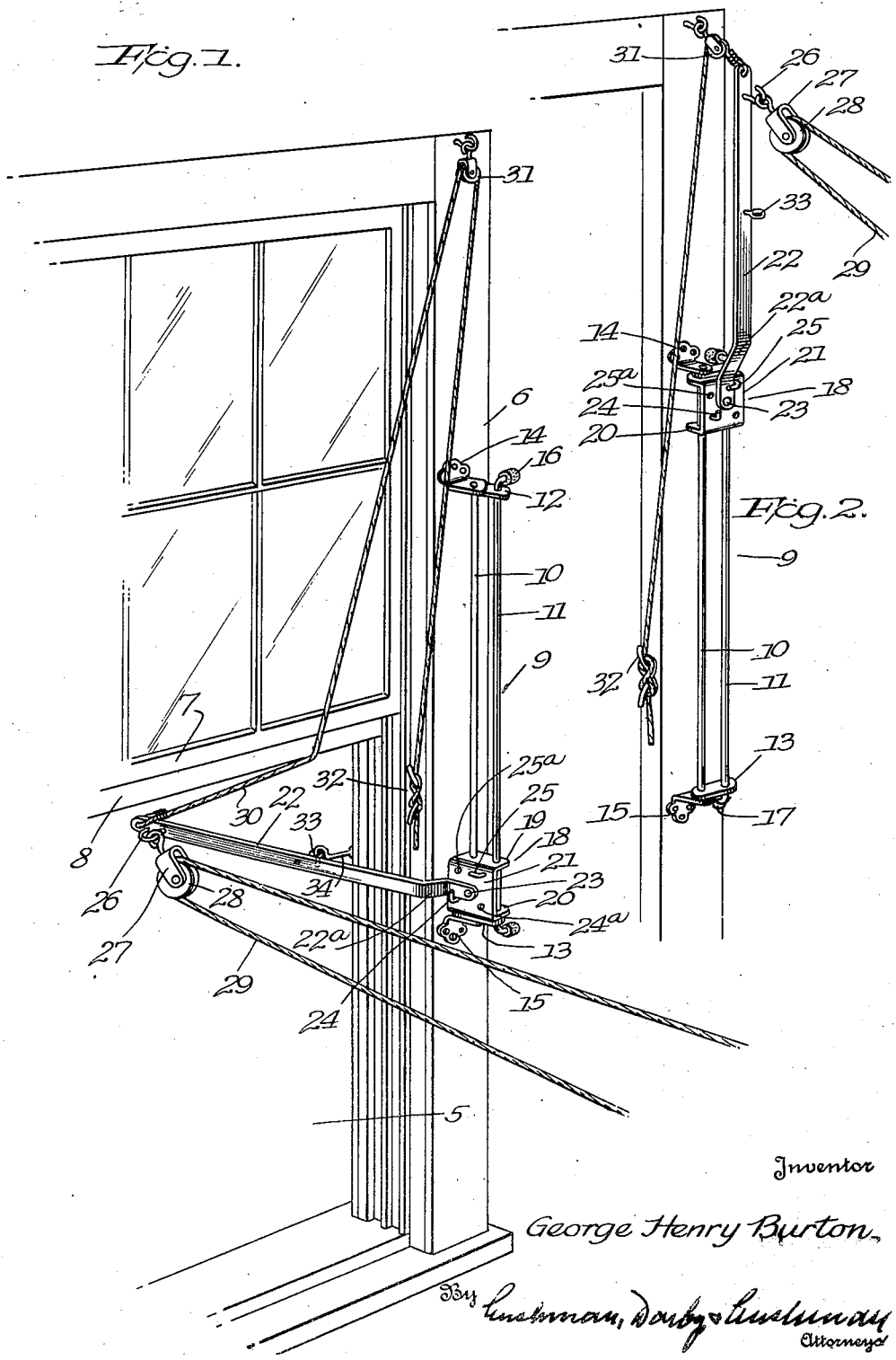
Inventor
George Henry Burton
By Cushman, Darby & Cushman
Attorneys Patented Jan. 23, 1940

2,188,032

UNITED STATES PATENT OFFICE 2,188,032

LINE SUPPORTING DEVICE AND INSTALLATION

George Henry Burton, Arlington, N. J.

Application November 14, 1938, Serial No. 240,424

2 Claims. (Cl. 211—119.06)

This invention relates to a device securable adjacent to a window or like opening in a building structure for the support of an endless line such as a clothes line. The invention has as an object to provide such a device as will afford safety in use in that the end of the line supported thereby may be easily brought through the opening to a position inside the building structure so that clothes may be hung on or removed from the line without any necessity of leaning out of the opening. A further feature of the device is that when clothes are not being hung on or removed from the line, the end of the line supported by the device is disposable outside of the opening, preferably in a position which leaves the opening entirely free from obstruction by the line or by the device itself.

A practical and illustrative form of the new device is shown in the accompanying drawing in which:

Figure 1 shows part of a window frame and the attached device in perspective, together with the supported end of the associated endless line, the device being in a relation wherein the said end of the line is disposed within the building structure of which the window frame is a part, and Figure 2 is similar to Figure 1, but shows the relation which the parts are caused to assume during drying or when the device is not in use.

Referring to the drawing, reference numeral 5 designates a window opening bounded at one side by an upright frame member 6. A pair of sashes 7 and 8 are shown in their uppermost position.

The supporting device itself comprises a frame 9 here shown as formed of parallel rods 10 and 11 having their end portions passed through openings in, and rigidly secured to, cross pieces 12 and 13. Desirably these frame members are secured together by welding, in the case of a metal structure. The extremities of rod 10 are pivotally supported in apertured ears of brackets 14 and 15 which are secured to frame member 6 so that rods 10 and 11 are vertically disposed and the frame 9 is pivotal relative to the brackets about the axis of rod 10. The lower bracket 15 is positioned a distance below the bottom edges of the raised sashes. Desirably, the extremities of rod 11 are bent to receive soft pads 16 and 17 which will abut frame member 6 without injuring the latter when the frame 9 is swung in a counter-clockwise direction about the axis of rod 10 into parallel relation with member 6.

Slidable on rods 10 and 11 between the cross pieces 12 and 13 is a member 18 here shown as being formed by bending a relatively short strip of sufficiently heavy plate metal to provide parallel flanges 19 and 20 which are apertured to receive the rods. Intermediate the flanges member 18 has a plane portion 21, which, as here shown is substantially square.

An arm 22 has one end pivoted to portion 21 of member 18 by means of a rivet or the like 23 which is about the center of portion 21. Studs 24 and 25 are screwed in threaded bores in portion 21, the former being positioned to support arm 22 in the substantially horizontal position shown in Figure 1, and the latter serving to limit the upward movement of the arm to a substantially vertical position. At its other end the arm is provided with a hook or other suitable provision 26 to which is connectable a clevis 27 which carries a pulley 28, the latter supporting one end of an endless line 29 whose other end may be supported by a similar pulley mounted exteriorly of the building structure and preferably directly opposite the window opening 5. At the extremity of arm 22 adjacent portion 26 it is provided with an aperture in which is fastened one end of a length of rope 30, which is carried upwardly about a pulley 31 supported on member 6 directly above frame 9, and then downwardly to a cleat 32 which is secured to the window frame below the lower edges of raised sashes 7 and 8 and in a position such as not to obstruct the movement of the sashes. An eye bolt 33, as here shown, is secured to the medial portion of arm 22 in position to be engaged by a hook 34 which is pivotally mounted on the inside of the window frame.

In Figure 1 member 18 is at the lower end of rods 10 and 11 and rests on cross piece 13 of the frame 9. Arm 22 is supported in substantial horizontal position by stud 24 and for the purpose of security this stud and stud 25 may have bent-over ends, as shown. Arm 22 has been swung through opening 5 and projects substantially directly into the building structure and is held in this position by the hook 34. The direct inward projection of the arm is made possible by providing it with an offset 22a which enables the edge of frame member 6 to be cleared. Rope 30 is slackened. Clothes may now be conveniently hung on the line from within the structure and with no necessity for leaning through the opening 5. Arm 22 may be of any desired length so long as it is able to swing through the window opening.

When the hanging operation has been completed, hook 34 is released and arm 22 is permitted to swing outwardly through the window opening until pads 16 and 17 engage frame member 6. The lower end of rope 30 is now grasped and pulled until arm 22 is swung upwardly into engagement with stud 25, whereupon both the arm and the member 18, together with the supported end of line 29, are elevated relative to the frame 9 to the position shown in Figure 2, in which position they are completely at one side of the window opening so that the latter is unobstructed. Rope 30 is secured to cleat 32 and serves to retain the parts in elevated position, taking most of the strain from arm 22.

When rope 30 is released from cleat 32, member 18 and arm 22 will move to the lower end of rods 10 and 11 and arm 22 will swing to horizontal position in front of the window opening. In order that this swinging movement of the arm will be immediately initiated by gravity, stud 25 may be so positioned as to prevent arm 22 from reaching a strictly vertical position when swung upwardly. The horizontally extending arm is then grasped and swung inwardly of the window opening and secured in this position by the hook 34.

If it should be desired to mount the device at the other side of the window opening it is only necessary to reverse the vertical relation of brackets 14 and 15 and to unscrew studs 24 and 25 and engage them in the appropriately located threaded bores 24a and 25a in face portion 21 of member 18. Pulley 31, cleat 32 and hook 34 would, of course, be appropriately re-arranged.

It will be understood that the device is not limited as to materials used in its construction nor to the exact form and arrangement of parts herein disclosed. The invention is susceptible of varied embodiment without departure from the following claims.

I claim:

1. A device of the class described comprising guide means securable in vertically extending relation to a building structure laterally of a side opening of the latter, a member slidable on said guide means and pivotal on a vertical axis, an arm pivoted at one end to said member for swinging movement between horizontal and upright positions, abutment means on said member cooperating with said arm to prevent swing of the latter downwardly beyond horizontally extending position, supporting means for one end of an endless line at the other end of said arm, said arm being swingable horizontally through said opening to project interiorly of the building structure when the arm is in horizontal position and said member is at the lower end of said guide means, means for releasibly securing said arm in such interiorly projecting position, and means operable when the arm is released and swung outwardly of the opening to swing the arm to upright position and to elevate it and said member relative to said guide means.

2. A device of the class described comprising a frame having parallel rods and bracket portions pivotally associated with the opposite ends of one of said rods and securable to a building structure laterally of a side opening of the latter to support said frame with said rods in vertical position, a member slidable on said rods, an arm pivoted at one end to said member for swinging movement between horizontal and upright positions, abutment means on said member cooperating with said arm to prevent swing of the latter downwardly beyond horizontally extending position, supporting means for one end of an endless line at the other end of said arm, said frame being swingable relative to said bracket portions to project said arm through said opening and into the building structure when the arm is in horizontally extending position and said member is at the lower end of said rods, means for releasibly securing said arm in such interiorly projecting position, and means operable when the arm is released and swung outwardly of the opening about the axis of said one of said rods to swing the arm to upright position and to elevate it and said member relative to said guide means.

GEORGE HENRY BURTON.